United States Patent
Chun et al.

(10) Patent No.: US 10,135,058 B2
(45) Date of Patent: Nov. 20, 2018

(54) RECHARGEABLE BATTERY WITH MULTI-LAYER VENT

(71) Applicant: Samsung SDI Co., Ltd., Yongin-si, Gyeonggi-do (KR)

(72) Inventors: Byoung-Min Chun, Yongin-si (KR); Shin-Jung Kim, Yongin-si (KR); Takao Abe, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 554 days.

(21) Appl. No.: 14/801,581

(22) Filed: Jul. 16, 2015

(65) Prior Publication Data

US 2016/0043367 A1 Feb. 11, 2016

(30) Foreign Application Priority Data

Aug. 11, 2014 (KR) .................. 10-2014-0103841

(51) Int. Cl.
*H01M 2/34* (2006.01)
*H01M 2/12* (2006.01)

(52) U.S. Cl.
CPC ......... *H01M 2/345* (2013.01); *H01M 2/1241* (2013.01); *H01M 2200/106* (2013.01)

(58) Field of Classification Search
CPC ............... H01M 2/345; H01M 2/1241; H01M 2200/106

USPC .......................................................... 429/53
See application file for complete search history.

(56) References Cited

U.S. PATENT DOCUMENTS

| 7,989,100 B2 | 8/2011 | Matsumoto et al. |
| 2006/0292437 A1 | 12/2006 | Matsumoto et al. |
| 2012/0028090 A1* | 2/2012 | Kyung-Su ........... H01M 2/0413 429/82 |
| 2014/0045000 A1* | 2/2014 | Kim ................. H01M 10/0525 429/56 |

FOREIGN PATENT DOCUMENTS

| KR | 10-2006-0055400 A | 5/2006 |
| KR | 10-2007-0030686 A | 3/2007 |
| KR | 10-2007-0082969 A | 8/2007 |
| KR | 10-2009-0026418 A | 3/2009 |

* cited by examiner

*Primary Examiner* — Gary D Harris
(74) *Attorney, Agent, or Firm* — Knobbe Martens Olson & Bear LLP (57) ABSTRACT

One aspect of the present invention provides a rechargeable battery that is capable of preventing a vent from being oxidized by preserving a plating layer of a surface of a vent. An exemplary embodiment of the present invention provides a rechargeable battery, including: an electrode assembly for performing charging and discharging operations; a case for accommodating the electrode assembly; and a cap assembly combined to an opening of the case and sealing the case. The case includes a vent at one side, and the vent has a plurality of ends in a thickness direction of the case and includes a plating layer on its surface.

9 Claims, 7 Drawing Sheets

RECHARGEABLE BATTERY WITH MULTI-LAYER VENT

INCORPORATION BY REFERENCE TO ANY PRIORITY APPLICATIONS

This application claims priority to and the benefit of Korean Patent Application No. 10-2014-0103841 filed in the Korean Intellectual Property Office on Aug. 11, 2014, the entire contents of which are incorporated herein by reference.

BACKGROUND OF THE INVENTION

Field of the Invention

The present invention relates to a rechargeable battery with a case including a vent.

Description of the Related Art

With advancement of technology and increasing demand for mobile devices, demand for rechargeable batteries as energy sources has been increasing.

For example, a cylindrical rechargeable battery includes an electrode assembly formed by disposing electrodes at opposite surfaces of a separator and winding the electrodes in a jelly roll form, a case accommodating the electrode assembly, and a cap assembly sealing an opening side of the case.

The cap assembly and an opening of the case interpose a gasket therebetween to be assembled by a crimping process.

That is, the case holds an external circumference of the cap assembly with a clamping portion connected to a beading portion recessed toward a diametrical center of the case from the opening side.

Due to charging and discharge operations of the electrode assembly, gas is generated inside of the rechargeable battery.

The generated gas increases the internal pressure of the rechargeable battery.

When the internal pressure reaches a predetermined value, a vent provided at one side of the case is opened to discharge the gas, thereby potentially preventing explosion of the rechargeable battery.

The case is provided with a plating layer to prevent it from being oxidized.

The case is punched by a punch to be formed with the vent having a predetermined depth.

When the vent is formed with a single punching operation, the plating layer can be damaged as a surface of the vent becomes rough, thereby causing the vent to be oxidized while it is used.

In addition, when the vent is formed by a single strong punching operation, the impact of the punch may shorten a lifespan of the punch.

The above information disclosed in this Background section is only for enhancement of understanding of the background of the invention and therefore it may contain information that does not form the prior art that is already known in this country to a person of ordinary skill in the art.

SUMMARY

One aspect of the present invention provides a rechargeable battery that is capable of preventing a vent from being oxidized by preserving a plating layer of a surface of the vent.

Another aspect of the present invention provides a rechargeable battery that is capable of forming a vent by lowering a punching force of a punch.

An exemplary embodiment of the present invention provides a rechargeable battery, including: an electrode assembly for performing charging and discharging operations; a case for accommodating the electrode assembly; and a cap assembly combined to an opening of the case and sealing the case. The case includes a vent at one side, and the vent has a plurality of ends in a thickness direction of the case and includes a plating layer on its surface.

The case may be formed to have a cylindrical shape, and the vent may be formed at a bottom of the case.

The vent may be formed at an external surface of the case.

The vent may include a first end that is formed to have a first width and a first depth on a surface of the case, and a second end that is formed from the first end to have a second width smaller than the first width and a second depth.

Centers of the first and second ends may be identical to each other.

Centers of the first and second ends may have an interval therebetween.

The vent may be formed to have a circular arc shape of a predetermined curvature that is set within a predetermined angle on an external surface of the cylindrical case at the bottom thereof.

The vent may be formed to have a circular shape of a predetermined radius at an external surface of the cylindrical case at the bottom thereof.

The vent may include a double-ended portion that is formed to have double ends within a predetermined angle, and a single-ended portion that is elongated from the double-ended portion to have a single end within the remaining angle.

The angle of the double-ended portion may be formed larger than that of the single-ended portion.

The case may be formed to have a prismatic shape, and the vent may be formed at a bottom of the case.

As described above, according to the exemplary embodiment of the present invention, the vent is formed to have a plurality of ends, thereby having an effect of preserving the plating layer at the vent surface.

Preservation of the plating layer may prevent the vent from being oxidized.

Since the vent is formed to have the plurality of ends, the punch for forming the vent may lower the punching force.

Thus, a lifespan of the punch for forming the vent may be extended.

DETAILED DESCRIPTION OF THE PREFERRED EMBODIMENT

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Figure 1:
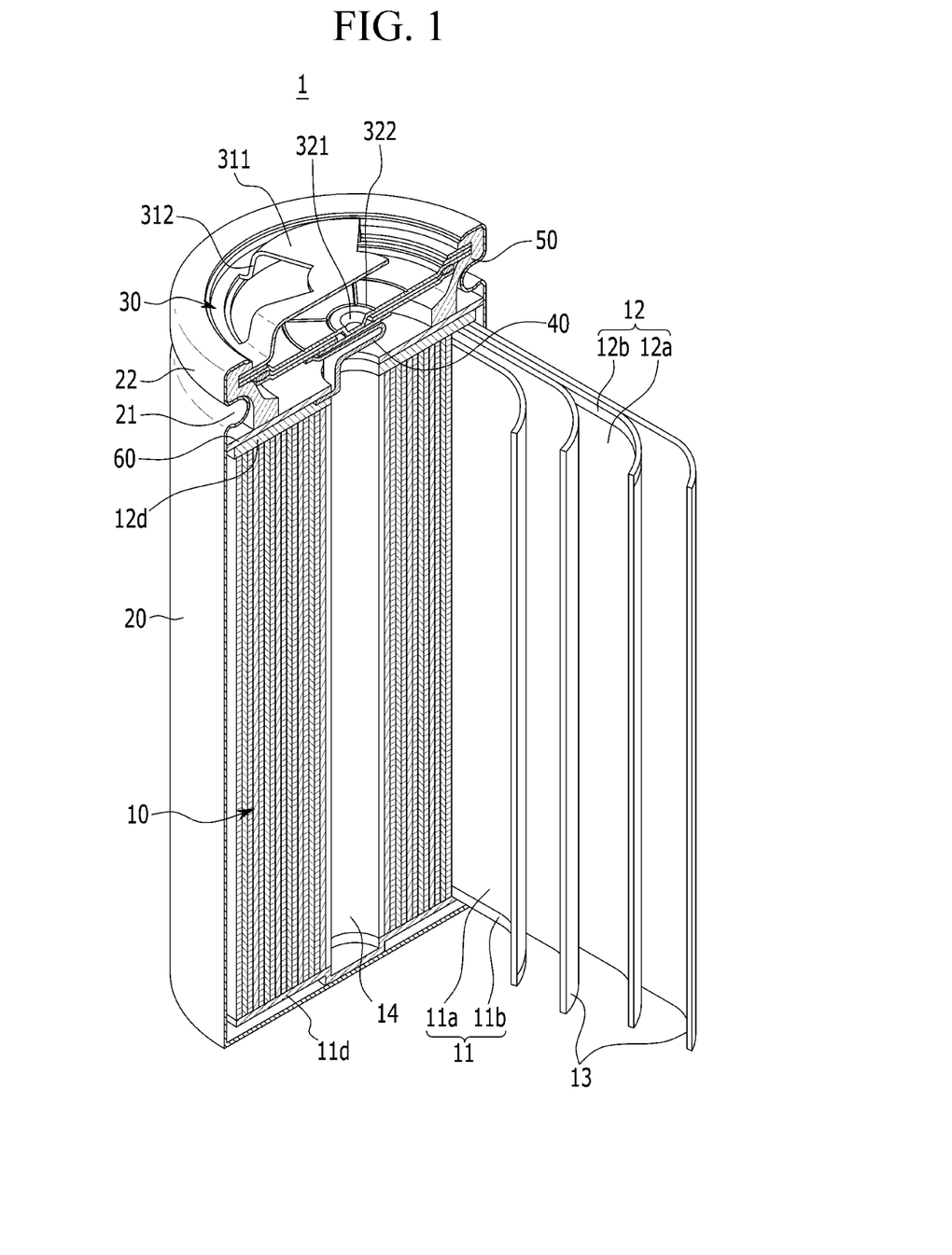
FIG. 1 is a cross-sectional perspective view of a rechargeable battery according to a first exemplary embodiment of the present invention.
Figure 2:
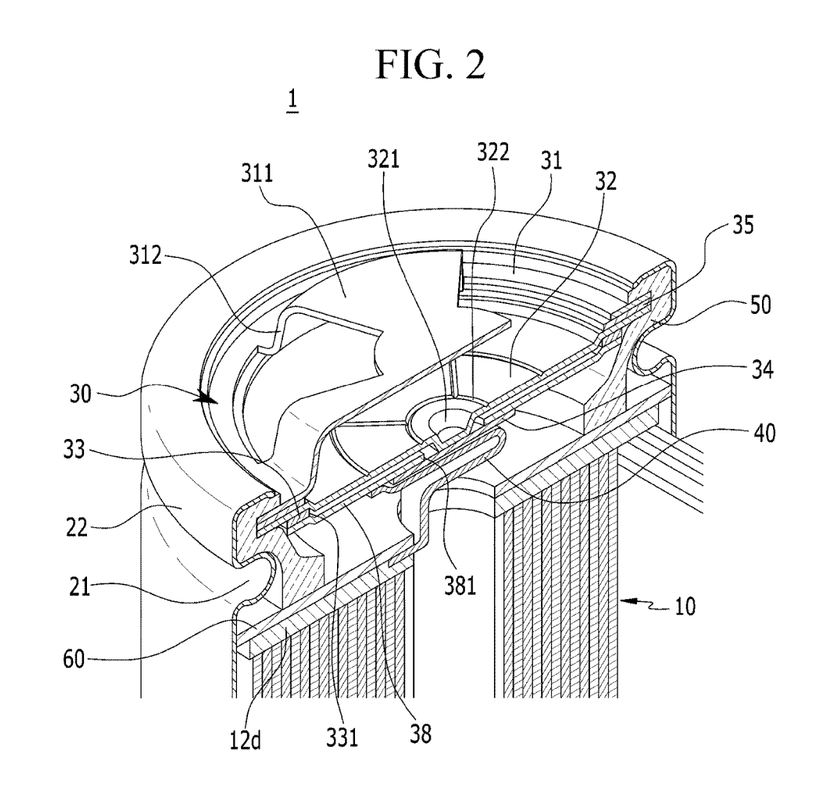
FIG. 2 is an enlarged cross-sectional perspective view of a cap assembly applicable to the rechargeable battery of FIG. 1.

FIG. 1 is a cross-sectional perspective view of a rechargeable battery according to a first exemplary embodiment of the present invention, and FIG. 2 is an enlarged cross-sectional perspective view of a cap assembly applicable to the rechargeable battery of FIG. 1.

Referring to FIGS. 1 and 2, the rechargeable battery 1 of the first exemplary embodiment includes an electrode assembly 10 for performing charging and discharging operations, a case 20 for accommodating the electrode assembly 10, and a cap assembly 30 for sealing an opening of the case 20.

The case 20 is electrically coupled to a first electrode 11 (e.g., a negative electrode) of the electrode assembly 10 to act as a negative electrode terminal.

The cap assembly 30 is combined to the opening of the case 20 while interposing a gasket 50 therebetween, and is electrically coupled to a second electrode 12 (e.g., a positive electrode) of the electrode assembly 10 to act as a positive electrode terminal.

As an example, the electrode assembly 10 includes the negative electrode 11, a separator 13, and the positive electrode 12 that are disposed to be sequentially laminated.

The electrode assembly 10 is formed by spirally winding the negative electrode 11, the positive electrode 12, and the separator 13 acting as an insulator therebetween in a jelly roll state.

The electrode assembly 10 may be formed to have a cylindrical shape.

The cylindrical electrode assembly 10 is provided with a center pin 14 at its center.

The center pin 14 is formed of a material having higher strength than the electrode assembly 10, thereby maintaining the cylindrical shape of the electrode assembly 10 and creating a discharging passage of the internal gas.

The negative and positive electrodes 11 and 12 include coated regions 11a and 12a where an active material is coated on opposite surfaces of a current collector formed of a thin metal foil (i.e., an aluminum or copper foil), and uncoated regions 11b and 12b where an active material is not coated thereon and thus are formed as exposed portions of current collectors.

In the jelly roll state, a negative electrode current collecting plate 11d is electrically connected to the uncoated regions 11b of the negative electrode 11 of the electrode assembly 10, and a positive electrode current collecting plate 12d is electrically connected to the uncoated regions 12b of the positive electrode 12 of the electrode assembly 10.

The case 20 is formed with the opening through which the electrode assembly 10 is inserted, and has a cylindrical shape to accommodate the cylindrical electrode assembly 10.

The case 20 is connected to the negative electrode current collecting plate 11d by welding to act as a negative electrode terminal in the rechargeable battery 1, and may be formed of a conductive metal such as aluminum, an aluminum alloy, or a nickel-plated metal.

The cap assembly 30 is combined to the opening of the case 20 while interposing the gasket 50 therebetween to be electrically insulated from the case 20, and seals the case 20 for accommodating the electrode assembly 10 and an electrolyte solution.

The cap assembly 30 is electrically connected to the electrode assembly 10 through the current interrupting device and a positive electrode lead tab 40.

In this case, an insulating plate 60 is interposed between the positive electrode current collecting plate 12d and the cap assembly 30 to insulate one from the other, and is penetrated by the positive electrode lead tab 40 coupled to the positive electrode current collecting plate 12d such that the positive electrode lead tab 40 is connected to the cap assembly 30.

The cap assembly 30 includes a cap plate 31, a positive temperature coefficient (PTC) element 35, a vent plate 32, an insulator 33, a middle plate 38, and a sub-plate 34, which are sequentially disposed toward an inner side of the case 20 from the outside.

The cap plate 31 is finally connected to the positive electrode lead tab 40 to act as a positive electrode terminal in the rechargeable battery 1, and is formed with a protruding portion 311 protruding out of the case 20 and an exhaust hole 312 that is opened toward a side of the protruding portion 311 to discharge internal gas.

Substantially, in the cap assembly 30, the current interrupting device is formed with the vent plate 32 and the sub-plate 34 that are electrically separated from each other by the insulator 33, and a connecting portion partially connecting the vent plate 32 and the sub-plate 34.

The connecting portion may be formed by welding the vent plate 32 and the sub-plate 34 together.

The vent plate 32 forming one side of the current interrupting device is installed at an inner side of the cap plate 31 to be electrically connected to the sub-plate 34 that forms the other side of the current interrupting device.

In addition, the vent plate 32 is provided with a first vent 321 at a center thereof to be welded to the sub-plate 34, and may be separated from the sub-plate 34 by internal pressure.

The first vent 321 is ruptured at a predetermined pressure condition and discharges internal gas, and cuts off electrical connection with the sub-plate 34.

For example, the first vent 321 protrudes toward inside of the case 20 from the vent plate 32.

The vent plate 32 is provided with a notch 322 that guides the rupture of the first vent 321 therearound.

Thus, when the internal pressure of the case 20 increases due to gas generation caused by the charging and discharging operations, the notch 322 may be pre-ruptured and discharge the gas to the outside through the vent plate 32 and the exhaust hole 312, thereby preventing explosion of the rechargeable battery 1.

In this case, the vent plate 32 is disconnected from the sub-plate 34 by the rupture of the first vent 321.

Thus, the electrode assembly 10 and the cap plate 31 are electrically separated from each other by an operation of the current interrupting device.

The PTC element 35 is provided between the cap plate 31 and the vent plate 32 to control a current flow therebetween according to internal temperature of the rechargeable battery 1.

When the internal temperature exceeds a predetermined level, the PTC element 35 has electrical resistance that increases to infinity.

Thus, the PTC element 35 may control a charging current or a discharging current between the cap plate 31 and the vent plate 32.

While facing the vent plate 32, the sub-plate 34 is electrically connected to the first vent 321 and the middle plate 38.

The middle plate 38 is separated from the vent plate 32, and is combined to the vent plate 32 while interposing the insulator 33 therebetween.

In addition, the first vent 321 protrudes through through-holes 331 and 381 of the insulator 33 and the middle plate 38 such that it is connected to the sub-plate 34.

Thus, the middle plate 38 is electrically connected to the first vent 321 and the vent plate 32 through the sub-plate 34.

The middle plate 38 is connected to the positive electrode lead tab 40 by welding, and the positive electrode lead tab 40 penetrates the insulating plate 60 to be connected to the uncoated region 12b of the positive electrode 12 by welding.

Finally, the positive electrode lead tab 40 sequentially passes through the middle plate 38, the sub-plate 34, the first vent 321, the vent plate 32, and the PTC element 35 to be electrically connected to the cap plate 31.

The cap assembly 30 configured as described above is inserted into the opening of the case 20 while interposing the gasket 50 therebetween, and is then fixed to the opening of the case 20 by a crimping process, thereby forming the rechargeable battery 1.

In this case, the case 20 is formed with a beading portion 21 depressed in a diametrical center of the case 20, and a clamping portion 22 configured to interpose the gasket 50 and to hold an external circumference of the assembly 30.

Figure 3:
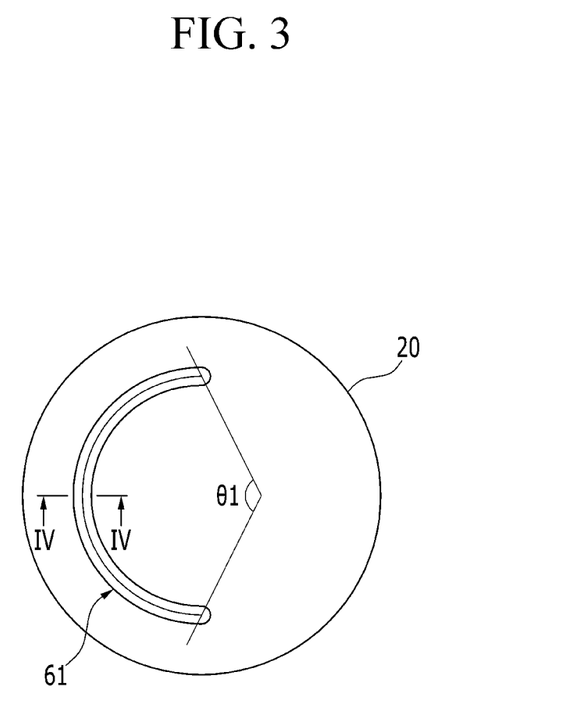
FIG. 3 is a bottom view of a case applicable to the rechargeable battery of FIG. 1.
Figure 4:
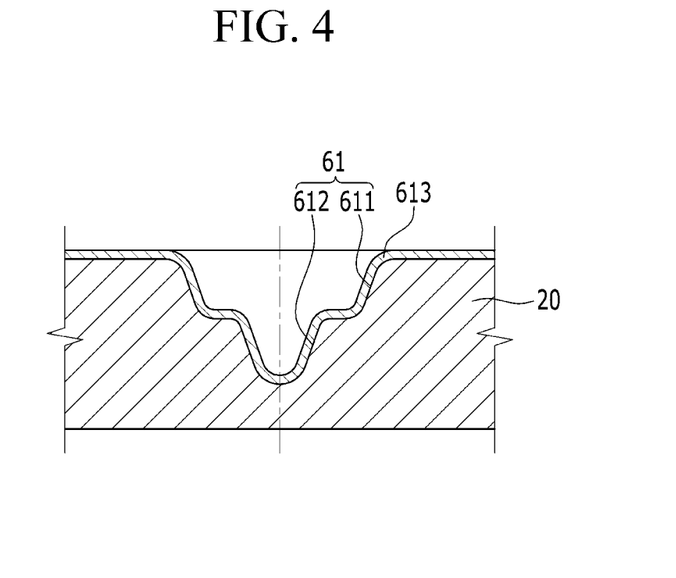
FIG. 4 is a cross-sectional view of FIG. 3 taken along the line IV-IV.

FIG. 3 is a bottom view of a case applicable to the rechargeable battery of FIG. 1, and FIG. 4 is a cross-sectional view of FIG. 3 taken along the line IV-IV.

Referring to FIGS. 3 and 4, a second vent 61 is provided at one side of the case 20.

The second vent 61 has a plurality of ends or depressions in a thickness direction of the case 20, and is provided with a plating layer 613 on its surface.

The plating layer 613 prevents the second vent 61 from being oxidized.

The plurality of ends or depressions may lower a punching force of the punch, thereby allowing the plating layer 613 to be preserved on the surface of the second vent 61.

For example, the second vent 61 is formed to have a notch structure in which the surface of the case 20 is recessed by punching of the case 20 including the plating layer 613.

The case 20 has a cylindrical shape, and the second vent 61 is formed at a bottom of the case 20.

Accordingly, when the internal pressure of the rechargeable battery 1 increases, the second vent 61 is opened to prevent explosion of the rechargeable battery 1.

In addition, the second vent 61 is formed on an external surface of the case 20 at the bottom thereof.

Accordingly, when the second vent 61 operates as the internal pressure of the rechargeable battery 1 increases, the second vent 61 is opened outside of the case 20.

The second vent 61 is formed to have a circular arc shape with a predetermined curvature that is set within a predetermined angle θ1 on the external surface of the cylindrical case 20 at the bottom thereof.

That is, since the second vent 61 is ruptured within the predetermined angle θ1 at the bottom of the cylindrical case 20, the internal gas may be rapidly discharged to prevent the explosion of the rechargeable battery 1.

For example, on the surface of the case 20, the second vent 61 includes a first end or depression 611 that is formed to have a first width W1 and a first depth D1, and a second end or depression 612 that is formed to have a second width W2 that is smaller than the first width W1 and a second depth D2.

The first and second depths D1 and D2 may be formed such that they are equal to or different from each other.

That is, the first end or depression 611 is formed on the surface of the case 20 with a single punching operation, and the second end depression 612 is formed from the first end 611 with another punching operation to the first end 611.

Accordingly, when forming the second vent 61, the first and second ends 611 and 612 may lower the punching force of the punch compared with that of the punch that is delivered at the single punch.

A lifespan of the punch may thereby be extended.

In addition, as the punching force of the punch is lowered, the plating layer 613 is less likely to be dislodged in the second vent 61.

That is, the plating layer 613 formed at the surfaces of the first and second ends 611 and 612 can be preserved.

That is, even if the first and second ends 611 and 612 are formed by the punching operations of the punch, the plating layer 613 may prevent or inhibit the second vent 61 from being oxidized.

In this case, a center of the first end or depression 611 is identical to that of the second end or depression 612.

Thus, when the second vent operates as the internal pressure of the rechargeable battery 1 increases, the second end or depression 612 extends inward from the first end or depression 611 may be ruptured.

In addition, in the first and second ends or depressions 611 and 612, the plating layer 613 has a symmetric structure based on the centers of the first and second ends or depressions 611 and 612.

The plating layer 613 has a uniform thickness in the first and second ends or depressions 611 and 612, thereby further preventing the second vent 61 from being partially oxidized.

Various exemplary embodiments of the present invention will now be described, and the same constituent elements as those of the first exemplary embodiment and the described exemplary embodiment will not be described while different constituent elements will be described.

Figure 5:
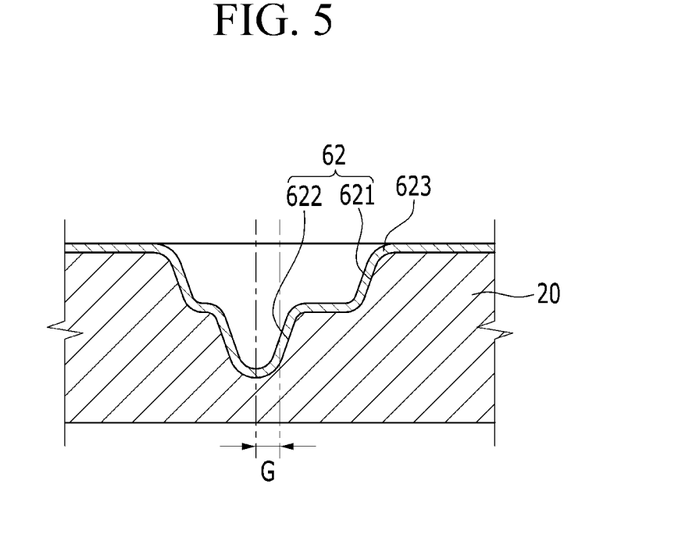
FIG. 5 is a partial cross-sectional view of a case applicable to a rechargeable battery according to a second exemplary embodiment of the present invention.

FIG. 5 is a partial cross-sectional view of a case applicable to a rechargeable battery according to a second exemplary embodiment of the present invention.

Referring to FIG. 5, in a second vent 62 of the second exemplary embodiment, centers of a first end or depression 621 and a second end or depression 622 have an interval G therebetween. In this case, the process of forming the second end or depression 622 may be easier than that of the described exemplary embodiment.

That is, the first end or depression 621 is formed on the surface of the case 20 with a single punching operation, and the second end or depression 622 is formed from the first end or depression 621 with another punching operation to the first end or depression 621.

After forming the first end or depression 621, due to deformation of the case 20, the second end or depression 622 may be formed at a position that is shifted by the interval G from the center of the first end or depression 621. That is, the second end or depression 622 may be formed without aligning centers of the first end or depression 621 and the second end or depression 622, though the case 20 is deformed after forming the first end or depression 621.

Thus, a plating layer 623 formed in the first and second ends or depressions 621 and 622 may have an asymmetric structure based on either one of the centers of the first end 621 and the second end 622.

Even if the first and second ends or depressions 621 and 622 are formed by the punching operations of the punch, the plating layer 623 may prevent the second vent 61 from being oxidized, and if there is the interval G between the centers of the first and second ends or depressions 621 and 622, the second end or depressions 622 extends inward from the first end or depression 621 may be ruptured when the second vent 62 operates.

In addition, in the first and second ends or depressions 621 and 622, the plating layer 623 has an asymmetric structure based on the respective centers of the first and second ends or depressions 621 and 622.

That is, the plating layer 623 may prevent the second vent 62 from being partially oxidized even when it has a non-uniform thickness in the first and second ends or depressions 621 and 622.

Figure 6:
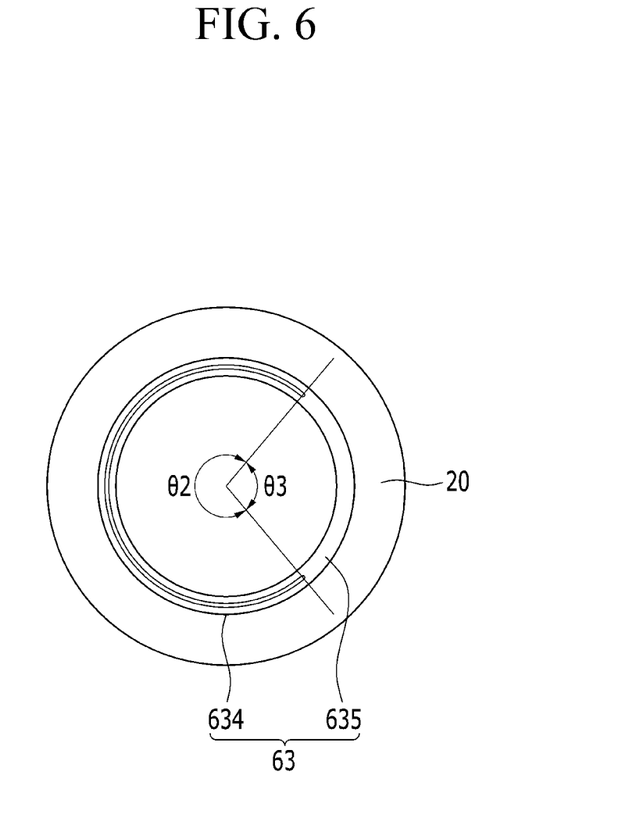
FIG. 6 is a bottom view of a case applicable to a rechargeable battery according to a third exemplary embodiment of the present invention.

FIG. 6 is a bottom view of a case applicable to a rechargeable battery according to a third exemplary embodiment of the present invention.

Referring to FIG. 6, a second vent 63 of the third exemplary embodiment has a circular shape of a predetermined radius that is set on the external surface of the cylindrical case 20 at the bottom thereof.

For example, the second vent 63 includes a double-ended or double depression portion 634 that is formed to have double ends or depressions within a predetermined angle θ2, and a single-ended portion 635 that extends from the double-ended portion 634 to have a single end or depression within a remaining angle θ3.

In this case, the angle θ2 of the double-ended portion 634 is formed larger than the angle θ3 of the single-ended portion 635, thereby allowing the second vent 63 to be easily opened.

Though not illustrated, the double-ended portion 634 may have the same connection structure as those of the first ends or depressions 611 and 621 and the second ends or depressions 612 and 622 of the second vents 61 and 62 of the first and second exemplary embodiments.

The single-ended portion or depression 635 may have a single end structure of the first ends or depressions 611 and 621, that is, a structure prior to forming the second ends or depressions 612 and 622 (refer to FIGS. 4 and 5).

Figure 7:
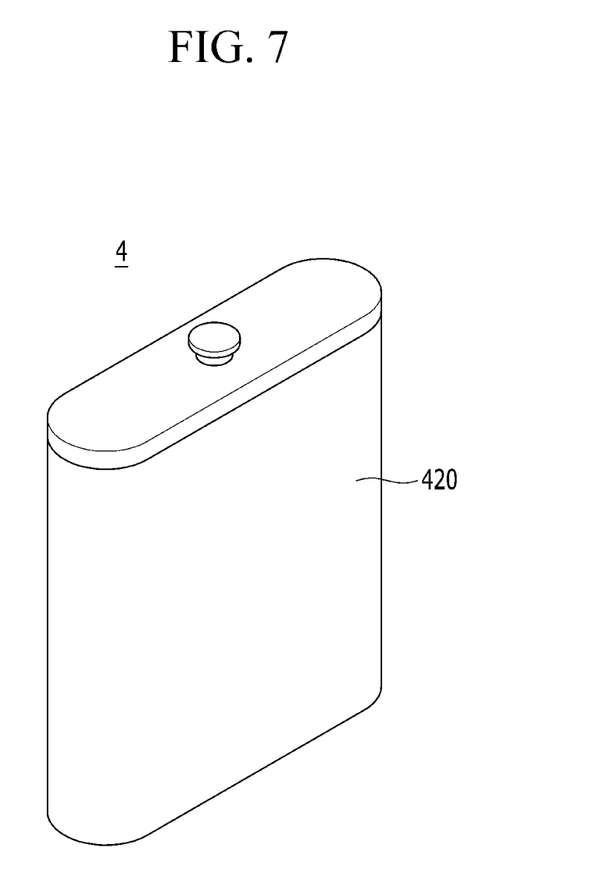
FIG. 7 is a perspective view of a rechargeable battery according to a fourth exemplary embodiment of the present invention.
Figure 8:
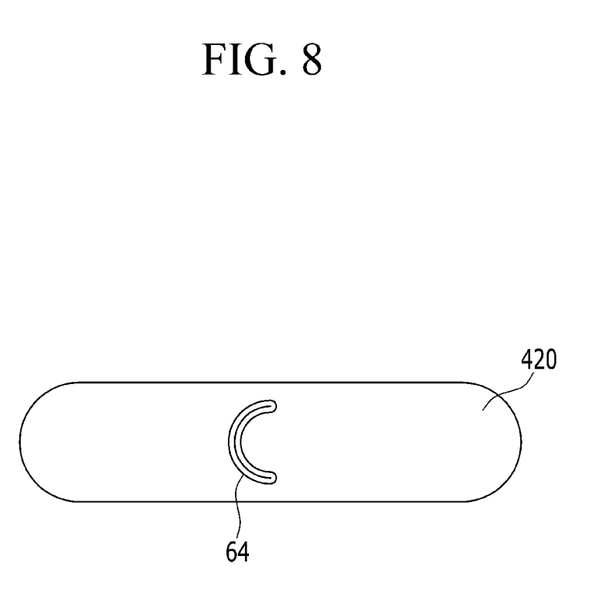
FIG. 8 is a bottom view of a case applicable to the rechargeable battery of FIG. 7.

FIG. 7 is a perspective view of a rechargeable battery according to a fourth exemplary embodiment of the present invention, and FIG. 8 is a bottom view of a case applicable to the rechargeable battery of FIG. 7.

Referring to FIGS. 7 and 8, the rechargeable battery 4 may be formed to have a prismatic shape.

A case 420 is formed to have a prismatic shape.

A second vent 64 may be formed at the bottom of the case 420.

For convenience, in the fourth exemplary embodiment, the second vent 64 illustrates the second vent 61 of the first exemplary embodiment, but the second vents 62 and 63 of the second and third exemplary embodiments may also be applicable thereto.

When the second vent 64 operates as the internal pressure of the rechargeable battery 4 increases, the internal gas of the case 420 can be discharged.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly for performing charging and discharging operations;
a case for accommodating the electrode assembly; and
a cap assembly combined to an opening of the case and sealing the case, wherein the case includes a vent having a length at one side formed into an outer surface of the case, and the vent has a plurality of ends in a thickness direction of the case having different depths and includes a plating layer on its surface wherein each of the ends having a constant depth from the outer surface of the case over the length of the vent.

2. The rechargeable battery of claim 1, wherein the case is formed to have a cylindrical shape, and the vent is formed at a bottom of the case.

3. The rechargeable battery of claim 1, wherein the vent is formed at an external surface of the case.

4. The rechargeable battery of claim 1, wherein the vent includes a first end that is formed to have a first width and a first depth on a surface of the case, and a second end that is formed from the first end to have a second width that is smaller than the first width and a second depth.

5. The rechargeable battery of claim 1, wherein the vent is formed to have a circular arc shape of a predetermined curvature that is set within a predetermined angle on an external surface of the cylindrical case at the bottom thereof.

6. The rechargeable battery of claim 1, wherein the vent is formed to have a circular shape of a predetermined radius at an external surface of the cylindrical case at the bottom thereof.

7. The rechargeable battery of claim 6, wherein the vent includes a double-ended portion that is formed to have double ends within a predetermined angle, and a single-ended portion that is elongated from the double-ended portion to have a single end within the remaining angle.

8. The rechargeable battery of claim 7, wherein the angle of the double-ended portion is formed larger than that of the single-ended portion.

9. The rechargeable battery of claim 1, wherein the case is formed to have a prismatic shape, and the vent is formed at a bottom of the case.

\* \* \* \* \*